(12) United States Patent
Freudenreich

(10) Patent No.: US 11,300,429 B2
(45) Date of Patent: Apr. 12, 2022

(54) TELESCOPE DEVICE-FOOT AND RESPECTIVE SYSTEM AND METHOD

(71) Applicant: Rohde & Schwarz GmbH & Co. KG, Munich (DE)

(72) Inventor: Markus Freudenreich, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 135 days.

(21) Appl. No.: 16/653,584

(22) Filed: Oct. 15, 2019

(65) Prior Publication Data
US 2021/0108949 A1  Apr. 15, 2021

(51) Int. Cl.
*G01D 11/30* (2006.01)
*F16M 11/38* (2006.01)

(52) U.S. Cl.
CPC ........... *G01D 11/30* (2013.01); *F16M 11/38* (2013.01); *F16M 2200/08* (2013.01)

(58) Field of Classification Search
CPC .... G01D 11/30; F16M 11/38; F16M 2200/08; F16M 11/10; F16M 11/041
USPC ..... 248/637, 188.5, 133, 139, 140, 371, 398
See application file for complete search history.

(56) References Cited

U.S. PATENT DOCUMENTS

| | | | | |
|---|---|---|---|---|
| 6,170,695 B1* | 1/2001 | Gabel | ...... | H05K 5/023 220/756 |
| 8,020,818 B2* | 9/2011 | Chou | ...... | F16M 11/10 248/176.1 |
| 8,186,639 B2* | 5/2012 | Wang | ...... | F16M 13/00 248/371 |
| D685,378 S * | 7/2013 | Deng | ...... | D14/447 |
| 2010/0243850 A1* | 9/2010 | Derry | ...... | F16M 11/38 248/372.1 |
| 2016/0252207 A1 | 9/2016 | Hollenberg et al. | | |

* cited by examiner

*Primary Examiner* — Muhammad Ijaz
(74) *Attorney, Agent, or Firm* — Ditthavong, Steiner & Mlotkowski

(57) ABSTRACT

A telescope device-foot for a test and/or measuring device is provided. The telescope device-foot comprises a foot basis, a fold-out section and a slider. The foot basis of the telescope device-foot is fixable at a housing of the test and/or measuring device. The fold-out section is mounted foldable at the foot basis. The fold-out section is foldable in a direction pointing away from the housing of the test and/or measuring device. The slider is movable in a direction of a back side of the test and/or measuring device relative to the foot basis.

19 Claims, 6 Drawing Sheets

101

TELESCOPE DEVICE-FOOT AND RESPECTIVE SYSTEM AND METHOD

TECHNICAL FIELD

This invention relates to a device-foot, especially a telescopic device-foot, applicable in test and/or measuring devices, a system comprising such a device-foot and a method for activating such a device-foot.

BACKGROUND ART

Device feet are used to ensure a standing stability of test and/or measuring devices, test equipment and other electronic devices at the location of operation. Typically, measuring devices are equipped with device-feet in a fixed position underneath the device housing. Measuring devices such as oscilloscopes and spectrum analysers tend to have a compact design with an increasing display area. As a result, the depth of the test and/or measuring devices decreases while the height increases. Therefore, the modern design housings use freely positionable handles or extended device feet.

For example, the document US 2016/0252207 A1 shows a locking foldable foot at the front side of an instrument and a non-locking foldable foot at the back side of the instrument. The locking foldable foot is arranged in mounting plated via a pivot. Even the non-locking foldable foot is arranged in mounting plated via a further pivot. The non-locking foldable foot can be folded out to extend the standing area of the instrument.

The state of the art is disadvantageous since it requires a lifting of the test and/or measuring device to a level extending the length of the folded foot positioned at the back side.

Accordingly, there is a need to provide a device-foot, which enhances the stand of the test and/or measuring device in particular in an inclining position.

SUMMARY OF THE INVENTION

According to one aspect of the invention, a telescope device-foot for a test and/or measuring device is provided. The telescope device-foot comprises a foot basis, a fold-out section and a slider. The foot basis of the telescope device-foot is fixable at a housing of the measuring device. The fold-out section is mounted foldable at the foot basis. The fold-out section is foldable in a direction pointing away from the housing of the measuring device. The slider is movable in a direction of a back side of the test and/or measuring device relative to the foot basis. This results in a wider standing area of a test and/or measuring device and therefore the risk of falling over is significantly reduced.

Advantageously and preferably, the slider of the telescope device-foot can be moved out of the standing area of the housing of the test and/or measuring device. This allows a positioning of the tilt edge of the test and/or measuring device in a distance that the test and/or measuring device will not fall over while operating the test and/or measuring device.

Further advantageously and preferably, the slider of the telescope device-foot has at least two snap-in positions. The first position is an original position. The telescope device-foot in the original position is pushed together compactly. The second position is a pulled out position. This results in an adaptable transportation and standing depth. This allows a stable locked positioning of the slider. Due to the snap-in positioning the user gets a direct feedback of the intended slider position. Further snap-in positions have the advantage that the slider may be used in different positions with different depths. Hence, the same slider may be reused for multiple devices. Thus, the amount of different device-feet may be reduced.

Advantageously and preferably, the fold-out section is mounted at the foot basis by a second slider. The second slider is configured to be movable in the direction of a front side of the housing of the measuring device. This results in an enhanced standing stability towards the front panel of the test and/or measuring device.

Advantageously and preferably, the extension range of the second slider is shorter than the extension range of the first slider. This results in a reduced standing area with the full standing stability characteristics.

Advantageously and preferably, the device foot comprises latching means protecting the sliders from accidental disengaging from the foot basis. This results in a protection against unwanted removal of the sliders from the foot basis.

Advantageously and preferably, the slider comprises at least one latching notch. Additionally, the foot basis comprises at least one latch configured to snap into the at least one latching notch. This allows a locking of the slider in predefined positions.

Advantageously and preferably, the at least one latch of the foot basis is connected to the foot basis by a spring element. This allows a movement of the locked slider with a defined release force.

Advantageously and preferably, the fold-out section has at least two snap-in positions. The first position is a flat foot position. The second position is an inclining position. This results in keeping the wanted position of the fold-out section in the influence of gravity.

Advantageously and preferably, the slider comprises at least one cross bar. This leads to an enhanced stability of the sliders in the gliding section by preventing from bend open.

Advantageously and preferably, the fold-out section comprises a bevel configured to provide a flat support with respect to the standing surface in the inclining position. This leads to an enlarged contact area at the working desk.

Advantageously and preferably, the foot basis comprises at least one snap on fitting for clipping on the housing of the measuring device. This allows a tool-free mounting of the telescope device-foot at the measuring device. Further snap-in positions have the advantage that the slider may be used in different positions with different depths. Hence, the same slider may be reused for multiple devices. Thus, the amount of different device-feet may be reduced.

Advantageously and preferably, the foot basis comprises at least one hole configured to receive a fastening element. This leads to a safe and durable fixation of the telescope device-foot at the test and/or measuring device.

Advantageously and preferably, the folded section comprises at least one anti-slip means. This leads to a secure stand even if the surface is slippery.

Advantageously and preferably, the at least one anti-slip means is positioned at the bevel of the folded section in a flat foot position. This allows profiting from the anti-slip characteristics in the folded out position of the folded section.

Advantageously and preferably, the one anti-slip means is applied in an area facing to the standing surface at the folded section in the flat foot position. This allows profiting from the anti-slip characteristics of the anti-slip means in the flat position of the folded section.

Advantageously and preferably, the at least one slider comprises at least one structured section configured to provide a skid resistance. This leads to an enhanced friction between the user's skin and the slider. Therefore, the user-friendliness of the slider is enhanced.

Advantageously and preferably, the folded section comprises a recess configured to receive a user's finger. This leads to a user-friendly displacement of the folded section being in the flat position.

According to a second aspect of the invitation, a test and/or measuring system is provided. Said test and/or measuring system comprises a measuring device and the telescope device-foot according to the first aspect of the invention.

According to a third aspect of the invitation, a method for activating the telescope device-foot according to the first aspect of this invention comprises the following steps. In a first step, the standing stability of the test and/or measuring device is determined. If the standing stability is insufficient, then the first slider is pulled out in the direction of the back side of the test and/or measuring device. If the enhanced standing stability is not needed, then the first slider is pushed in the direction of the housing of the test and/or measuring device.

BRIEF DESCRIPTION OF THE DRAWINGS

An exemplary embodiment of the invention is now further explained with respect to the drawings by way of example only, in which.

DETAILED DESCRIPTION OF PREFERRED EMBODIMENTS

FIG. 1A-5B show an exemplary embodiment of the inventive telescope device-foot 101 according to the first aspect of the invention. FIG. 6 shows the method steps for activating the inventive telescope device-foot.

Figure 1A:
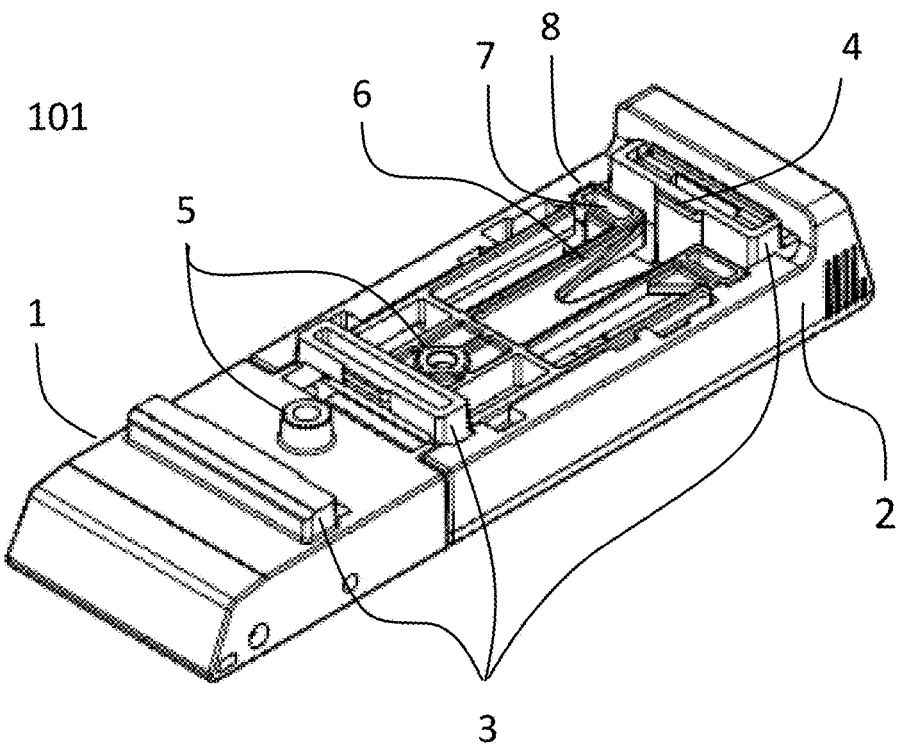
FIG. 1A shows the perspective view from the top of an exemplary embodiment of the inventive device-foot in a folded basic position and with the slider in a basic first position.

FIG. 1A shows the perspective view from the top of the inventive telescope device-foot 101 in the most compact setting. The telescope device-foot 101 comprises a foot basis 1 and a slider 2. The slider 2 is applied movable in a longitudinal direction to the foot basis 1.

The foot basis 1 is provided with snap-on fittings 3. These snap-on fittings 3 are suitable for tool-less fixing of the telescope device-foot 101 on a measuring device (not shown in FIG. 1A). For this, the measuring device comprises recess areas for receiving the snap-on fittings 3. The snap-on fittings 3 are provided with a nose 4 for locking them in position. Additionally, at least one hole 5 is applied to the foot basis 1. Each of the at least one hole 5 is suitable to receive a fastening element. A fastening element may be a screw. There are several kind of screws suitable for this application, e.g. TORX, security TORX, Imbus, Philips, Prozidriv etc. A further fastening element is a rivet. Using rivets leads to a non-removable connection of the telescope device-foot 101 with the measuring device.

FIG. 1A shows the telescope device-foot in a setup, where the slider 2 is in a basic first position. This is the most space saving configuration. The foot basis 1 comprises at least one spring element 6 connected to a at least one latch 7. The slider 1 comprises at least one latching notch 8. The latch 7 of the foot basis 1 is configured to snap into the latching notch 8 of the slider 2. The force of the spring elements is suitable to prevent an undesired movement of the slider 2 even under the weight of a fully equipped measuring device.

Figure 1B:
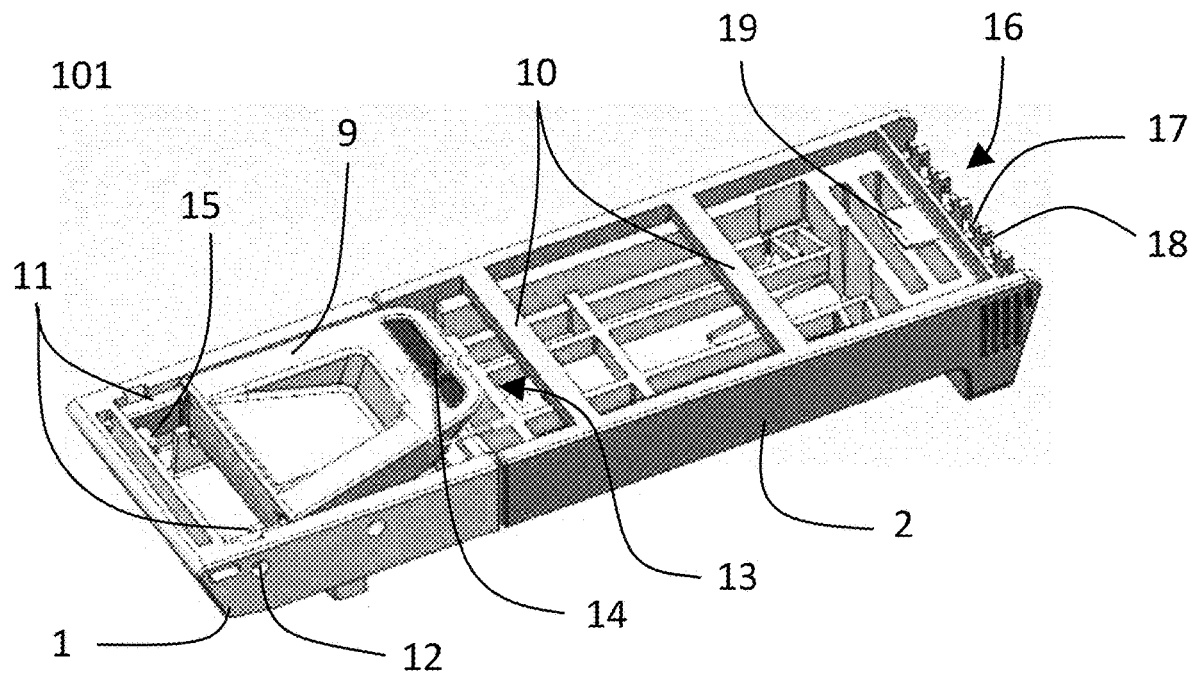
FIG. 1B shows the perspective view from the bottom of the exemplary embodiment of the inventive device-foot in a folded basic position and with the slider in a basic first position.

FIG. 1B shows a bottom view of the said telescope device-foot. Here further details are shown. The slider 2 shown here comprises at least one cross bar 10. The cross bars 10 enhance the stability of the slider 2 significantly. Without these cross bars 10, the tendency of bending the slider 2 open due to load is very high. The cross bars 10 absorb the traverse force that may occur during heavy load.

FIG. 1B shows the telescope device-foot 101 with its folding section 9 in more detail. For illustration, the folding section 9 is not completely folded in. The folded section 9 is mounted at the foot basis 1 of the telescope device-foot 101. Therefore, the folded section comprises a joint section 11 configured to be fixed in joint holes 12 of the foot basis 1. This connection between the foot basis 1 and the folding section 9 is designed so that the folding section is rotatable around the joint holes 12. The joint section 11 comprises further at least one interlock element 15. The interlock element 15 holds the folding section 9 in one of both end-positions. The first position is a folded position and the second position is the unfolded position.

A recess 13 is applied in the area of the tip of the folding section 9. The recess 13 enables a user to move the folding section 9 into an unfolded position with the fingertip. The folding section 9 is further equipped with an anti-slip means 14. This anti-slip means is a high friction material embedded into the surface of the folding section 9. The high friction material is preferably a silicone, a nitril, a polyurethane, a neoprene or another elastomeric material.

Figure 2A:
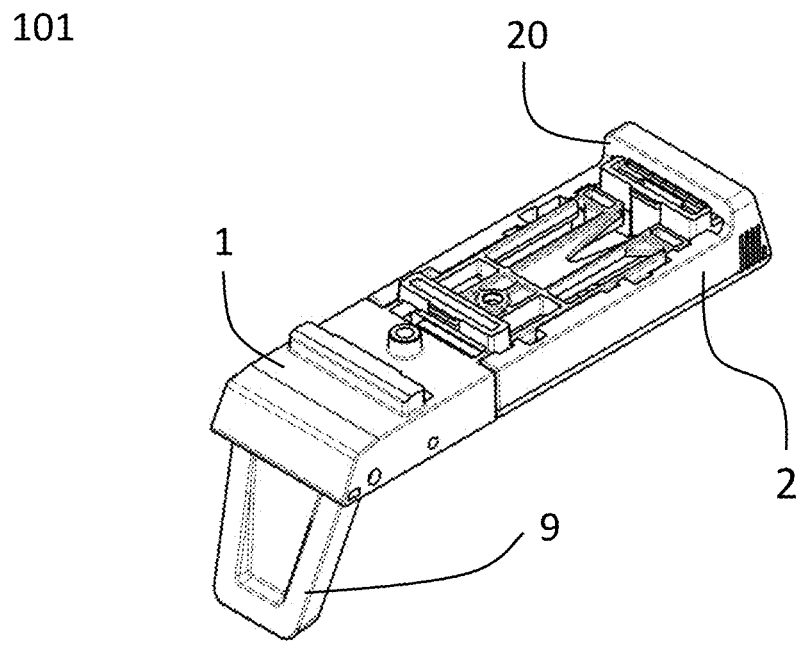
FIG. 2A shows the perspective view of the exemplary embodiment of the inventive device-foot in an un-folded position and with the slider in a basic first position.
Figure 2B:
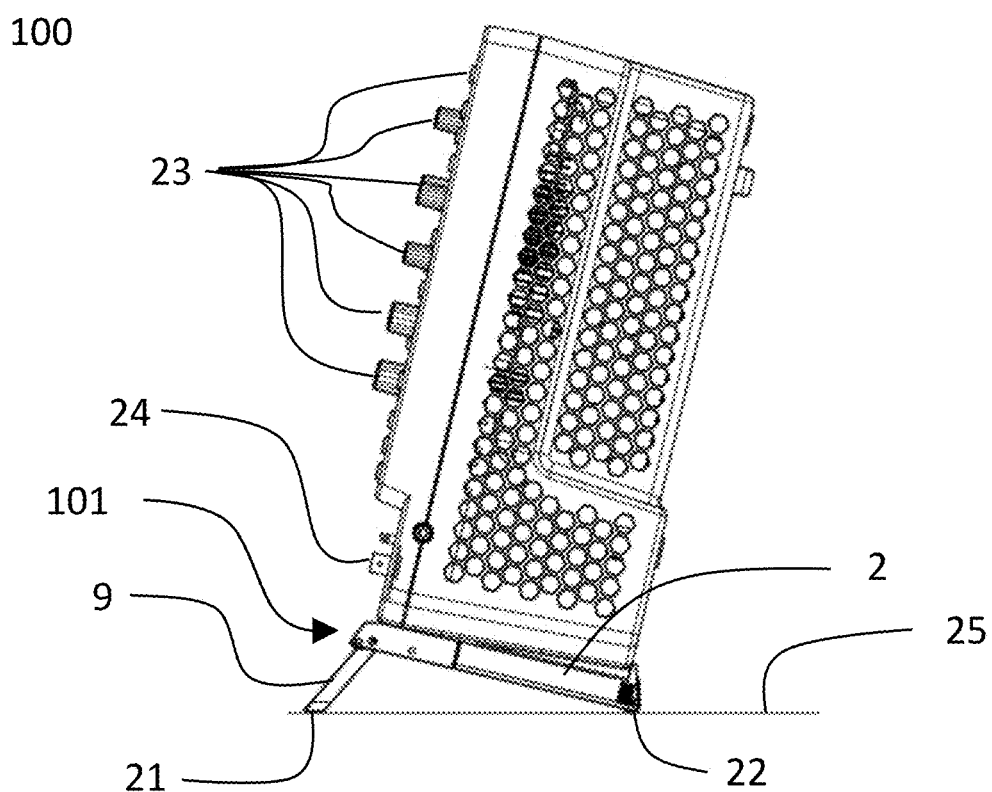
FIG. 2B shows the side view of a measuring system comprising the inventive device-foot in an un-folded position and with the slider in a basic first position.

The slider 2 comprises further holding elements 16 for receiving an edge anti slip element 22 (see FIG. 2B). These holding elements comprise pins 17 and hooks 18. The holding elements 16 allow a tool-free mounting of a preformed edge anti slip element. The pins 17 and the hooks 18 are designed so that the edge anti slip element 22 is kept in position under all operating condition. Advantageously, the edge anti slip element 22 is interchangeable in case of a damage or maintenance.

FIG. 1B shows a latching means 19 as an integral part of the foot basis 1. The latching means 19 is a resilient lobe. This resilient lobe is directly formed to the foot basis. While mounting the slider 2, the latching means 19 is slipping through the cross bars 10. The crossbars 10 bend the latching means 19 in the direction to the mounting side of the foot basis 1 while passing the crossbars 10. When the latching means 19 has crossed the crossbars 10, the latching means 19 returns into its relaxed position because of its resilience. Once the slider 2 is mounted at the foot base 1, the slider 2 is not accidentally removable from the foot-base 1. For maintenance purposes, the slider 2 is removable by using a suitable tool.

FIG. 2A shows the perspective view from the top of the inventive telescope device-foot 101 in folded out setting. The folding section 9 is brought into a position pointing away from the foot basis 1. The folding section 2 is locked to this position with the help of the at least one interlock element 15 (see FIG. 1B). The slider remains in the basic pushed in position. The slider 2 of the telescope device-foot comprises a means of limit stop 20 The means of limit stop 20 is configured to prevent the slider from being pushed extensively into the foot basis 1.

FIG. 2B shows a measuring device 100 with a mounted telescope device-foot 101. The telescope device-foot 101 is set up according to FIG. 2A, so that the slider 2 being pushed in and the folding section 9 being in an unfolded position.

The folding section 9 comprises a bevel 21. As it can be seen in FIG. 2B the bevel 21 is designed with an angle resulting in a flat support with respect to a standing surface 25. The measuring device 100 is positioned in this setup in an inclining position. The position is capable of enhancing the operability of measuring device 100. The operating controls 23 as well as the connector 24 is in a preferable orientation to the operator. For a further enhanced standing, the bevel 21 is provided with an anti-slip means facing the standing surface. This anti-slip means is a high friction material embedded into the surface of the bevel 21. The high friction material is preferably a silicone, a nitril, a polyurethane, a neoprene or other elastomeric materials. The slider 2 comprises an edge anti slip element 22. The edge anti slip element 22 is a preformed component preferably of silicone, nitril, polyurethane, neoprene or other elastomeric materials. The preformed edge anti slip element 22 is applied to the slider 2 as described before.

Figure 3A:
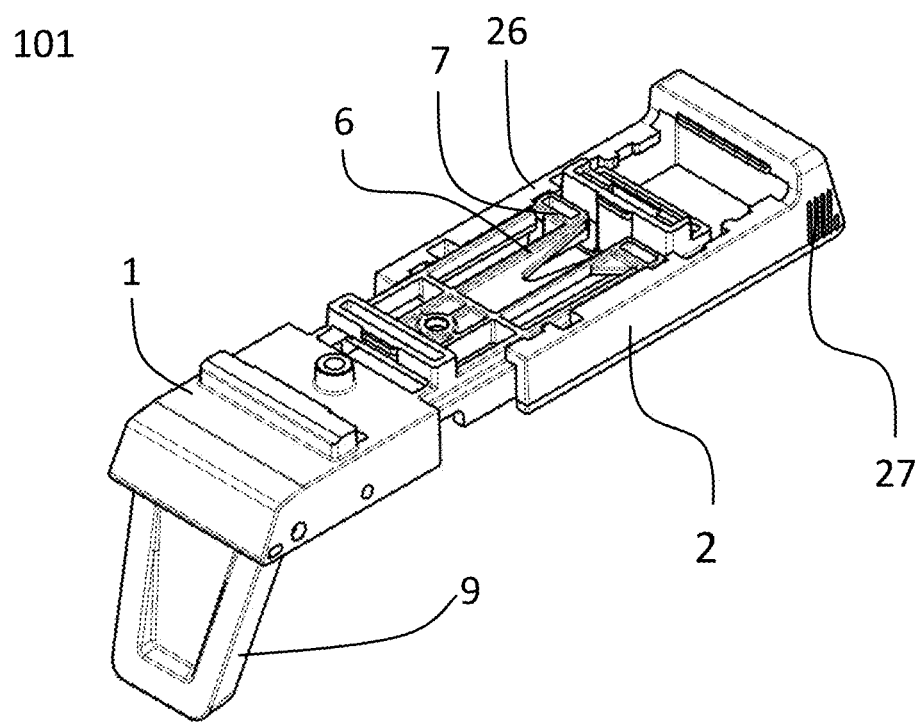
FIG. 3A shows the perspective view of the exemplary embodiment of the inventive device-foot in an un-folded position and with the slider pulled out in a second position.

FIG. 3A shows the perspective view from the top of the inventive telescope device-foot 101 in folded out setting. The folding section 9 is in a position pointing away from the foot basis 1 and is locked as already described. The slider 2 is placed in a half pulled out position.

For this, the slider 1 comprises a further at least one latching notch in a medium position 26. The latch 7 of the foot basis 1 is configured to snap into the further latching notch 26 in the medium position of the slider 2. The spring elements 6 apply a force to the latch 7 to prevent an undesired movement of the slider 2 even under the weight of a fully equipped measuring device 100. The slider 2 comprises a structured section 27 at the end of the slider 2. The structured section 27 improves the friction between the users finger and the slider. This further enhances the user-friendliness of the telescope device-foot while pulling the slider 2 out.

Figure 3B:
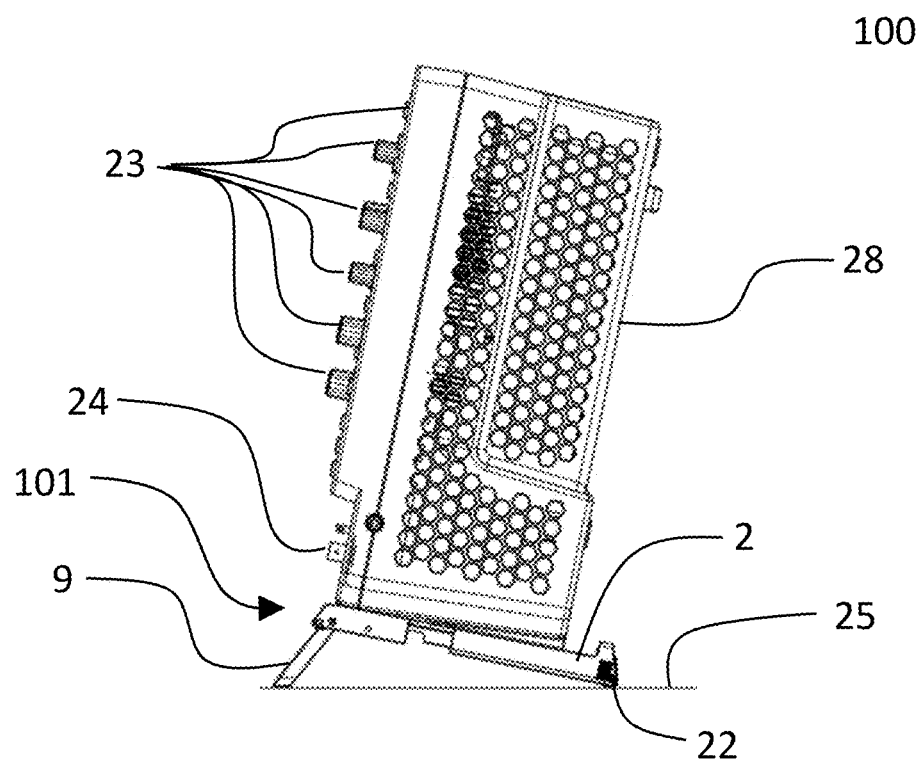
FIG. 3B shows the side view of the measuring system comprising the inventive device-foot in an un-folded position and with the slider pulled out in a second position.

FIG. 3B shows a measuring device 100 with a mounted telescope device-foot 101. The setting of the telescope device-foot is according to FIG. 3A. Herein, the slider 2 is pulled out in a medium position and the folding section 9 is in an unfolded position. It can be seen in FIG. 3B that the standing area ending at the edge anti slip element 22 attached to the slider 2 extends to the corner of the measuring device housing 28 opposite to the device controls 23. This leads to an enhancement of the standing stability of the measuring device 100 as the tilting edge is moved away from the center of gravity of the measuring device 100.

Figure 4A:
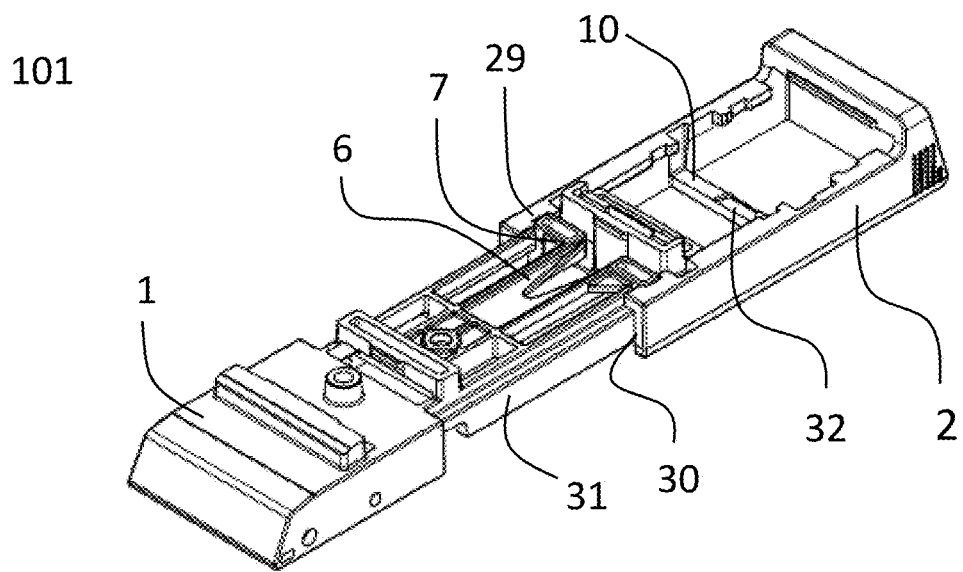
FIG. 4A shows the perspective view of the exemplary embodiment of the inventive device-foot in a folded basic position and with the slider in a fully pulled out position.

FIG. 4A shows the perspective view from the top of the inventive telescope device-foot 101 in a folded out setting. The folding section 9 is in a folded in position and is locked in this position. The slider 2 is placed in a fully pulled out position. For this, the slider 1 comprises at least one further latching notch in a pulled out end position 29. The latch 7 of the foot basis 1 is configured to snap into the end position latching notch 29. When the latch 7 is snapped into the end position of the slider 2, the spring element 6 applies a force to the latch 7 to prevent an undesired movement of the slider 2.

FIG. 4A shows the guide of the telescope device-foot 101 in more detail. The slider 2 comprises L-formed sidewalls 30 and the foot basis 1 comprises a gliding bars 31. The L-formed sidewalls 30 is dimensioned so that the gliding bars 31 is movable without getting jammed. The cross bar 10 of the slider 2 prevents the slider 2 from tilting with respect to the foot basis 1.

The latching means 19 described in the corresponding section of FIG. 1B is in interaction with the cross bars 10. To enable a full pull out capability of the slider 2, it is to be ensured that the latching means 19 only engages in the desired cross bar 10. Each cross bar 10, which is not involved in engaging the latching means 19 is provided with a recess 32. The recess 32 is configured to enable a passing of the latching means 19.

Figure 4B:
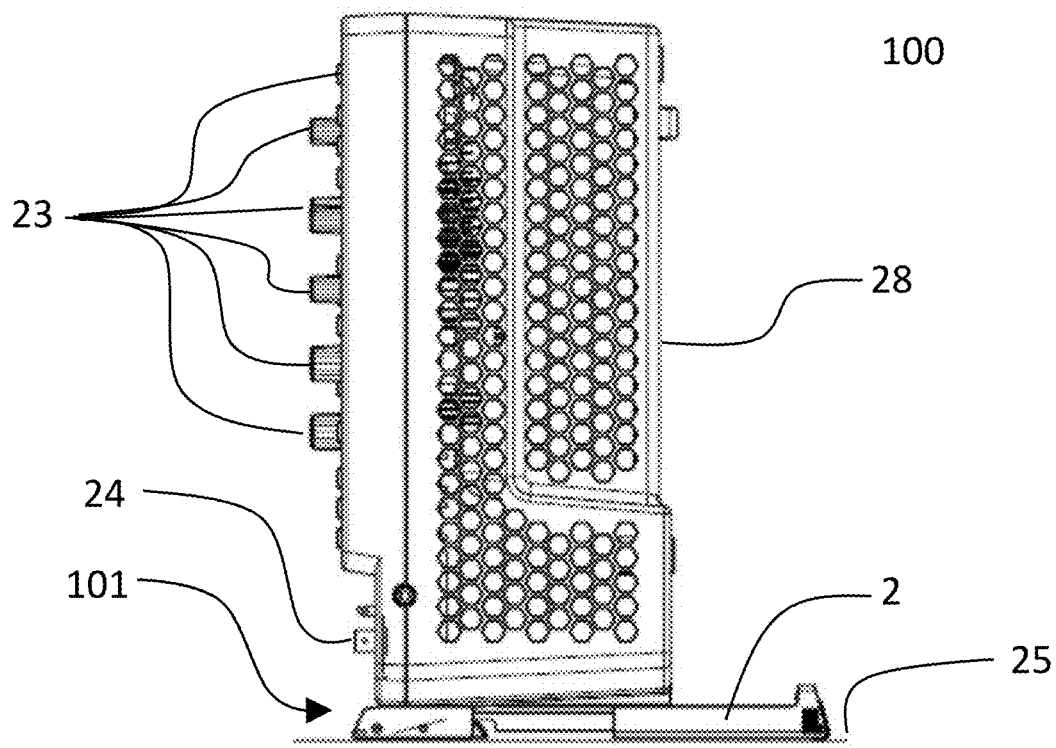
FIG. 4B shows the side view of the measuring system comprising the inventive device-foot in a folded basic position and with the slider in a fully pulled out position.

FIG. 4B shows a measuring device 100 with a mounted telescope device-foot 101. Here, the slider 2 is positioned in a fully pulled out position and the folding section 9 is positioned in an folded position. It can be seen in FIG. 4B that the standing area widely extends the back side of the measuring device housing 28. This leads to an extraordinary standing stability of the measuring device 100. This position of the measuring device 100 is preferred when reflections of ambient light in a display of the measuring device 100 must be reduced.

Figure 5A:
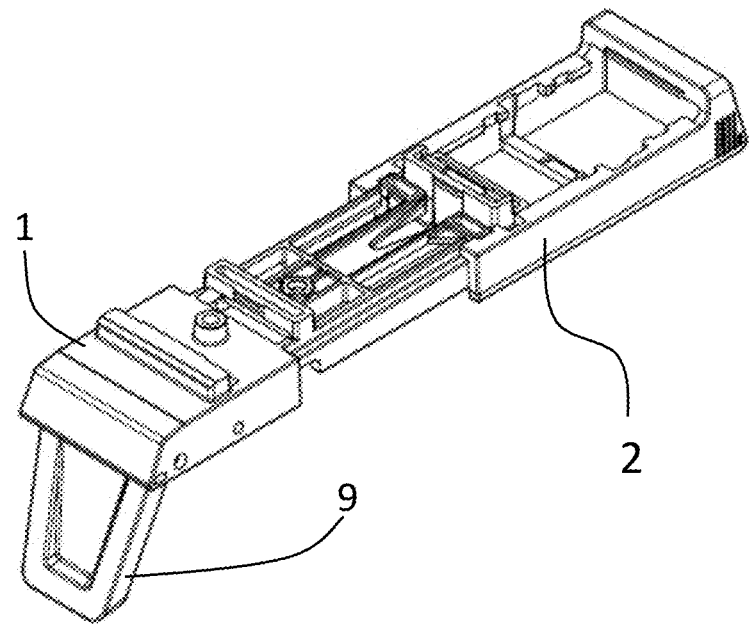
FIG. 5A shows the perspective view of the exemplary embodiment of the inventive device-foot in an un-folded position and with the slider in a fully pulled out position.
Figure 6:
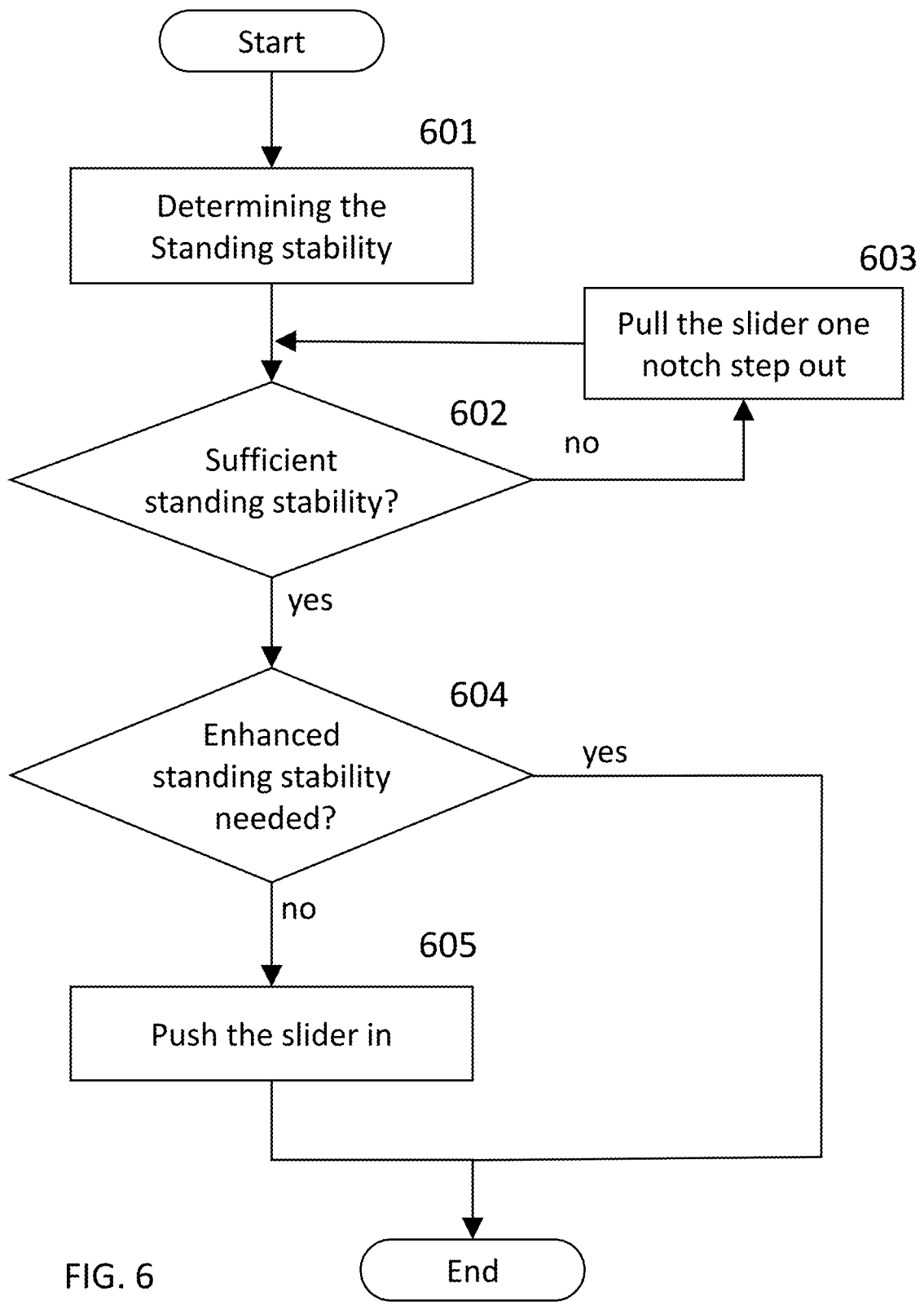
FIG. 6 shows a flow diagram illustrating the steps for activating the telescope device-foot.

FIG. 5A shows the perspective view from the top of the inventive telescope device-foot 101 in a folded out setting. The folding section 9 is in a position pointing away from the foot basis 1 and is locked as already described. The slider 2 is placed in a fully pulled out position.

Figure 5B:
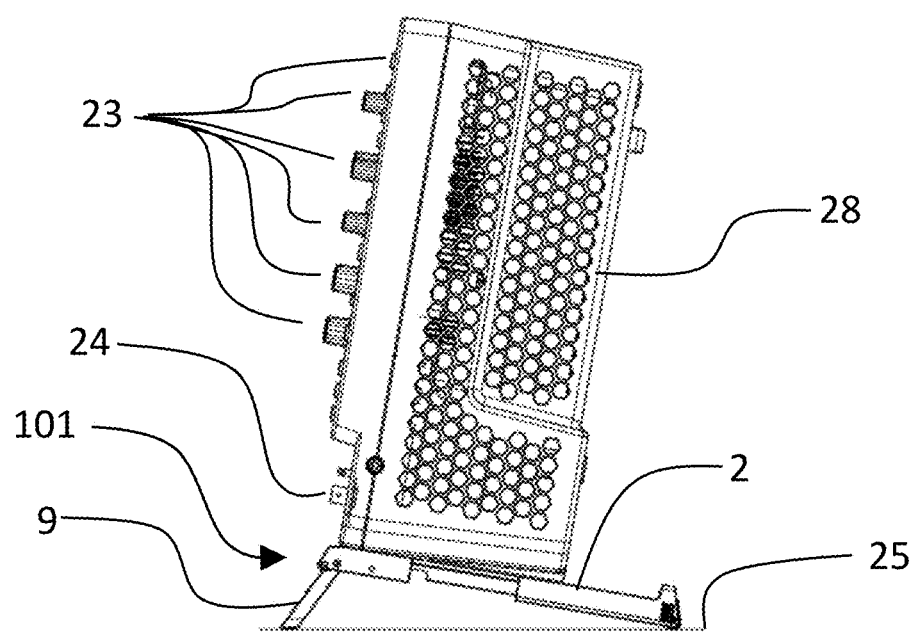
FIG. 5B shows the side view of the measuring system comprising the inventive device-foot in an un-folded position and with the slider in a fully pulled out position.

FIG. 5B shows a measuring device 100 with a mounted telescope device-foot 101. The setting of the telescope device-foot is according to FIG. 5A. It can be seen in FIG. 5B that the standing area extends wildy through the backside of the measuring device housing 28. This leads to an enhancement of the standing stability of the measuring device 100. The user is enabled to push or rotate the controls 23 of the measuring device with higher force. Such higher forces can occur when the user uses working gloves. The measuring device 100 is further protected from tilting, even by using rigid lines with big diameters connected to a connector 24.

FIG. 6 shows an exemplary flow diagram for a method for activating the telescope device-foot 101. In a first step 601, the standing stability of the measuring device 100 with respect to the standing surface 25 is determined. When the standing stability is not sufficient, the flow is branched in step 602 to a step 603 of pulling the sliders 2 one notch step out. The pulling of the slider 2 enhances the standing stability. Step 603 is fed back to step 602 for a further stability check. Furthermore, in step 604 it is checked if the enhanced standing stability is needed. In case of a superfluity of the enhanced standing stability, in step 605 the sliders are pushed in.

A further embodiment of the telescope device-foot is a telescope device-foot, wherein the fold-out section is mounted at the foot basis by a second slider. This slider comprises in a wide range the same features as the slider 2. The second slider is configured to be movable in the direction of a front side of the housing of the measuring device. The fold-out section at this second slider is mounted at the outer end of the slider. This second slider with the fold out section enhances the tilt robustness of the measuring device in the front side direction.

The danger of tilting the measuring device forwards is less than the danger of the unit tilting backwards. Therefore, the extension range of the second slider is shorter than an extension range of the first slider. The different slider lengths result in a compact telescope device-foot design with the full tilt protection capabilities.

While various embodiments of the present invention have been described above, it should be understood that they have been presented by way of example only, and not limitation. For example, the measuring device described above can also be a test device or any other suitable device. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A telescope device-foot for an at least one of test or measuring device, comprising:
   a foot basis,
   a fold-out section, and
   at least one slider;
   wherein the foot basis is fixable at a housing of the at least one of test or measuring device;
   wherein the fold-out section is mounted at the foot basis;
   wherein the fold-out section is configured to be folded in a direction pointing away from the housing of the at least one of test or measuring device;
   wherein a first slider of the at least one slider is configured to be movable relative to the foot basis in a direction of a back side of the at least one of test or measuring device,
   wherein the foot basis comprises at least one snap on fitting for clipping on the housing of the at least one of test and measuring device.

2. The telescope device-foot in particular for a measuring device of claim 1, wherein the at least one slider can be moved beyond a stand area of the housing of the at least one of test or measuring device.

3. The telescope device-foot of claim 1,
   wherein the at least one slider has at least two snap-in positions,
   wherein a first position is an original position, and
   wherein a second position is a pulled-out position.

4. The telescope device-foot of claim 1,
   wherein the fold-out section is mounted at the foot basis by a second slider,
   wherein the second slider is configured to be movable in the direction of a front side of the housing of the at least one of test or measuring device.

5. The telescope device-foot of claim 4, wherein an extension range of the second slider is shorter than an extension range of the first slider.

6. The telescope device-foot of claim 1, wherein the telescope device-foot comprises latching means protecting the at least one slider from accidental disengaging from the foot basis.

7. The telescope device-foot of claim 1,
   wherein the at least one slider comprises at least one latching notch, and
   wherein the foot basis comprises at least one latch configured to snap into the at least one latching notch.

8. The telescope device-foot of claim 7, wherein the at least one latch is connected to the foot basis by a spring element.

9. The telescope device-foot of claim 1,
   wherein the fold-out section has at least two snap-in positions,
   wherein a first snap in position is a flat foot position, and
   wherein a second snap in position is an inclining position.

10. The telescope device-foot of claim 1, wherein the at least one slider comprises at least one cross bar.

11. The telescope device-foot of claim 1, wherein the fold-out section comprises a bevel configured to provide a flat support with respect to a standing surface in an inclining position.

12. The telescope device-foot of claim 1, wherein the foot basis comprises at least one hole configured to receive a fastening element.

13. The telescope device-foot of claim 1, wherein the fold-out section comprises at least one anti-slip means.

14. The telescope device-foot of claim 13, wherein the at least one anti-slip means is positioned at the bevel of the fold-out section.

15. The telescope device-foot of claim 13, wherein the at least one anti-slip means is applied in an area facing to a standing surface at the folded section in a flat foot position.

16. The telescope device-foot of claim 1, wherein the at least one slider comprises at least one structured section configured to provide a skid resistance.

17. The telescope device-foot of claim 1, wherein the fold-out section comprises a recess configured to receive a user's finger.

18. At least one of test or measuring system comprising:
   an at least one of test or measuring device and the telescope device-foot according to claim 1.

19. A method for activating the telescope device-foot of claim 1 comprising the following steps:
   determining standing stability of the measuring device,
   if the standing stability is insufficient, then pulling the first slider in the direction of the back side of the measuring device,
   if the standing stability is not needed, then pushing the first slider in a direction of the housing of the measuring device.

* * * * *